United States Patent

[11] 3,579,139

[72] Inventor Dong Woo Rhee
Williamsville, N.Y.
[21] Appl. No. 661,388
[22] Filed Aug. 17, 1967
[45] Patented May 18, 1971
[73] Assignee Sylvania Electric Products Inc.

[54] HORIZONTAL CIRCUITRY FOR TELEVISION RECEIVERS
3 Claims, 5 Drawing Figs.

[52] U.S. Cl. .......... 331/8, 178/69.5TV, 331/113R
[51] Int. Cl. .......... H04l 7/04
[50] Field of Search .......... 331/8, 20, 113, 145; 332/14; 178/69.5

[56] References Cited

UNITED STATES PATENTS

| | | | |
|---|---|---|---|
| 2,994,013 | 7/1961 | Skellett | 331/113 |
| 3,045,062 | 7/1962 | Heffron et al. | 178/69.5 |
| 3,178,658 | 4/1965 | Henrion | 332/14 |
| 3,183,368 | 5/1965 | Ross | 331/113 |
| 3,209,278 | 9/1965 | Binkis | 178/69.5 |
| 3,231,829 | 1/1966 | Reid | 331/20 |
| 3,239,778 | 3/1966 | Rywak | 331/113 |
| 3,341,788 | 9/1967 | Nishioka | 331/113 |

*Primary Examiner*—John Kominski
*Attorneys*—Norman J. O'Malley, Robert E. Strausser and Cyril A. Krenzer

ABSTRACT: Transistorized horizontal oscillator and drive circuitry for a television receiver including a modified common emitter multivibrator with the emitter electrode of the multivibrator output transistor coupled directly to the base electrode of a drive transistor.

INVENTOR.
DONG W. RHEE
BY
Robert E. Strauss
ATTORNEY

HORIZONTAL CIRCUITRY FOR TELEVISION RECEIVERS

BACKGROUND OF THE INVENTION

In a television receiver the horizontal control section generates signals for the horizontal scanning and blanking functions, and in addition generates the high voltage for the cathode-ray tube. The control circuitry includes an oscillator having a frequency of approximately 15,750 cycles per second which must be in synchronization with signals received from the transmitted signal. The output of the horizontal oscillator is applied through a driver stage to the horizontal sweep and high voltage circuitry, a portion of the sweep signal therein developed being fed back to an automatic frequency control (AFC) network where it is compared with the incoming synchronization signals to provide correction voltages operative to insure synchronization of the horizontal oscillator.

Various oscillator circuits, such as the direct coupled multivibrator for example, are used as the horizontal frequency generator in a television receiver. However, most such circuits have exhibited relatively poor frequency stability thereby requiring additional compensating circuitry or providing marginal operating performance. This is especially true of transistorized circuits, wherein the frequency stability depends on RC time constants and upon the transistor parameters, which are temperature dependent thereby occasioning a substantial frequency drift over the range of operating temperatures. Also, transistorized circuitry is prone to change frequency as load conditions change. In addition, it is found that prior art circuits are quite susceptible to noise and exhibit frequency drift upon the loss of occasional synchronization signals. Therefore, the automatic frequency control network used with prior circuits had to be operable over a relatively wide frequency range to properly compensate for frequency variations of the oscillator. Also, it was found desirable to provide a discrete coupling network between the oscillator and driver circuitry to preclude the possibility of having load variations affect the frequency of the oscillator.

OBJECTS AND SUMMARY OF THE INVENTION

Accordingly, it is a primary object of this invention to provide improved horizontal oscillator and drive circuitry for a television receiver which overcomes the disadvantages of the aforementioned prior art circuits.

Another object of this invention is to provide improved horizontal oscillator and drive circuitry which is relatively simple in design and has improved stability over wide operating ranges.

Still another object of this invention is to provide horizontal oscillator and drive circuitry which do not require component coupling therebetween.

Yet another object of the invention is to provide a horizontal oscillator wherein the transistor parameters have a minimal effect on the oscillator output frequency.

These and other objects are achieved in one aspect of the invention by using a modified common emitter multivibrator oscillator with the emitter electrode of the output transistor coupled directly to the base electrode of the drive transistor.

DESCRIPTION OF THE PREFERRED EMBODIMENTS

For a better understanding of the present invention, together with other and further objects, advantages and capabilities thereof, reference is made to the following disclosure and appended claims in connection with the above described drawings.

The present invention will be described in conjunction with a monochrome television receiver although it will be readily apparent to those skilled in the art that the invention could be utilized in a color television receiver.

Figures 1, 2, 3:
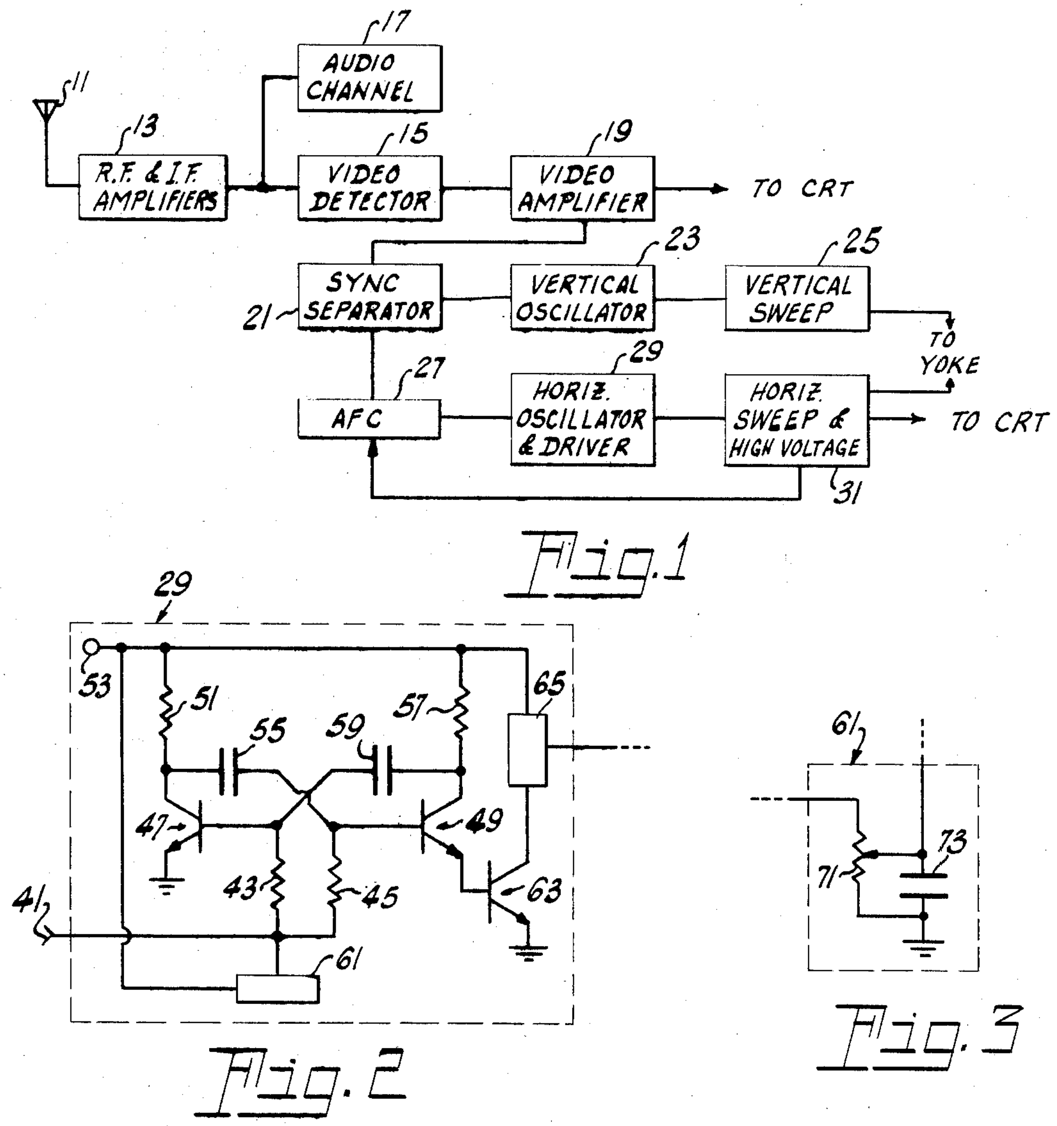
FIG. 1 is a block diagram of a television receiver in which the present invention finds utility.
FIG. 2 is a schematic circuit diagram of one embodiment of the horizontal oscillator and drive circuit according to the present invention.
FIG. 3 is a partial schematic circuit diagram illustrating a typical bias network which may be used in conjunction with the multivibrator of FIG. 2.

Referring now to FIG. 1, a typical television receiver includes an antenna 11 connected to an RF, IF amplifier stage 13, the output of which is applied to a video detector 15 and to the audio channel 17 of the receiver. The output of the video detector is connected to a video amplifier 19, one output of which is applied to the cathode-ray tube and a second output is applied to the sync separator 21 of the control circuitry. The sync separator provides outputs to the vertical oscillator 23 and to the automatic frequency control 27 which feeds the horizontal oscillator and drive circuit 29. The output of the vertical oscillator goes through vertical sweep circuitry 25 and is applied to a yoke on the cathode-ray tube to affect the vertical scan of the cathode-ray tube. The output of the horizontal oscillator and drive circuitry is applied to the horizontal sweep and high voltage circuitry 31, which provides one output to the yoke of the cathode-ray tube to affect the horizontal scan of the cathode-ray tube and a second output is applied to the anode of the cathode-ray tube to provide the high voltage necessary for operation.

In operation the transmitted signal received by the antenna is processed through the RF and IF amplifiers 13 to produce an intermediate frequency signal. At the output of the IF amplifiers the sound portion of the signal is suitable detected and applied to the audio channel 17, and a composite video signal is applied to the video detector 15. The video detector strips away any RF signal from the composite video signal and applies the video signal to the video amplifier 19. In the video amplifier the control signals are separated from the luminance signals, the luminance signals being amplified and applied to the cathode-ray tube and the control signals being applied to the sync separator 21. The one output of the sync separator provides the vertical sync pulses to the vertical oscillator 23 which operates in conjunction with the vertical sweep circuitry 25 to provide the signal necessary to accomplish the vertical scan of the cathode-ray tube. The other output from the sync separator 21 is applied to the AFC circuit 27 which is coupled to the horizontal oscillator and drive circuitry 29 to provide correction voltages to maintain the oscillator in synchronization with the incoming signal. The horizontal oscillator and drive output is applied to the sweep and high voltage circuitry 31 which develops the high voltage for the anode of the cathode-ray tube and also develops the signals to accomplish horizontal scanning of the cathode-ray tube. A portion of the horizontal scan signal is coupled from the circuit 31 back to the AFC circuit 27 where it is compared with the incoming horizontal synchronization signals to provide a corrected signal if the horizontal oscillator is out of synchronization.

Referring now to FIG. 2, there is shown in schematic form horizontal oscillator and drive circuitry 29 according to the present invention. The input 41 from the AFC network is coupled via resistors 43 and 45 to the base electrodes of transistors 47 and 49 respectively. The collector electrode of the transistor 47 is connected by means of a resistor 51 to a source of operating potential as represented by the terminal 53, and is also coupled via a capacitor 55 to the base electrode of the transistor 49. In similar fashion the collector electrode of transistor 49 is connected via a resistor 57 to the source of operating potential 53, and by means of a capacitor 59 to the base electrode of the transistor 47. A biasing network 61 is connected between the input terminal 41 and the source of operating potential 53.

The emitter electrode of transistor 47 is connected directly to ground, but the emitter electrode of the transistor 49 is directly coupled to the base electrode of a drive transistor 63, which has its emitter electrode connected directly to ground. The load 65 of the drive transistor 63 is connected between the collector electrode and the source of operating potential 53.

A typical biasing network for use in conjunction with the multivibrator of FIG. 2 is shown schematically in FIG. 3. A potentiometer 71 is connected between the source of operating potential 53 and ground, the center tap of the potentiometer being connected directly to the junction of the base resistors 43 and 45. A capacitor 73 is connected between the center tap of the potentiometer 71 and ground.

In operation, the circuit of FIG. 2 functions as a free-running or astable multivibrator providing a square wave current output. During one time period, $t_1$, transistor 47 is conducting in saturation and transistor 49 is cut off. During a second time period, $t_2$, the situation is reversed with transistor 47 cut off and transistor 49 conducting in saturation. The time for one complete cycle of operation is $t_1$ plus $t_2$, so that the frequency of operation, $f$, is equal to $1/t_1+t_2$. The time periods $t_1$ and $t_2$ are determined largely by the base resistors 43 and 45, the collector to base capacitors 55 and 59, the magnitude of the source of operating potential 53 and the voltage applied to the junction of the base resistors 43 and 45. It can be shown that as long as the source potential 53 and the base bias voltage at the terminal 41 are sufficiently higher than the collector to ground saturation voltages of the transistors 47 and 49, the transistor saturation characteristics have minimal effect on the frequency stability of the circuit. Furthermore, the multivibrator is isolated from the output load 65, so that changing load conditions does not noticeably affect the frequency stability of the circuit.

Synchronization of the operating frequency of the circuit 29 with the incoming horizontal synchronization signals is accomplished by the DC correction voltage from the AFC circuit 27 applied to the input terminal 41. As described above, a portion of the horizontal sweep signal is fed back from the circuit 31 to the AFC circuit 27 where it is compared with the incoming horizontal synchronization pulses from the sync separator 21. If the oscillator frequency is low, the AFC circuit develops a positive DC correction voltage which, when applied to the terminal 41, raises the frequency of operation of the oscillator and driver 29. Conversely, a negative or less positive DC voltage from the AFC circuit lowers the frequency of the oscillator.

Figure 4:
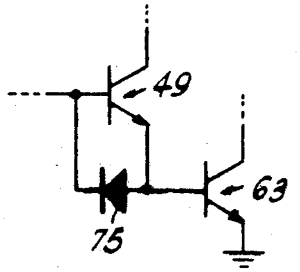
FIG. 4 is a partial schematic circuit diagram illustrating an alternate embodiment of the output transistor and drive transistor of FIG. 2.
Figure 5:
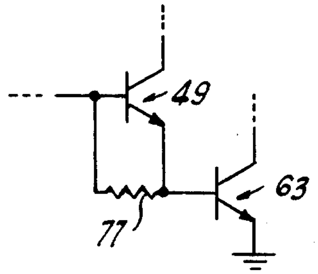
FIG. 5 is a partial schematic circuit diagram illustrating yet another embodiment of the output transistor and drive transistor of FIG. 2.

Referring next to FIGS. 4 and 5, there are shown alternate embodiments of the present invention which consist of connecting a diode 75 or a resistor 77, respectively, between the base electrode of the drive transistor 63 and the base electrode of the multivibrator output transistor 49. These devices effectively increase the switching speed of the circuit to provide sharper output signals. They may be utilized, for example, to permit the use of less expensive transistors without degrading the output signal characteristics.

It is therefore apparent that applicant has provided a horizontal oscillator and drive circuit which exhibits improved frequency stability and is less affected by changes in transistor parameters. Since there is no component coupling required between the multivibrator output transistor and the drive transistor, the circuit is more economical in design. Also, by effectively isolating the load from the multivibrator oscillator, changing load conditions have only minimal effect on the circuit stability. Because of the increased stability of the circuit, still further economies may be affected in the overall receiver since the automatic frequency control circuit is not required to operate over such a wide range of frequency deviations.

While there have been shown and described what are at present considered the preferred embodiments of the invention, it will be obvious to those skilled in the art that various changes and modifications may be made therein without departing from the scope of the invention as defined by the appended claims.

I claim:

1. In a television receiver including horizontal sweep and high voltage circuitry and an automatic frequency control circuit, wherein said automatic frequency control circuit is adapted to receive incoming horizontal synchronization signals and a portion of the horizontal sweep signals and is operative to provide an output correction signal whenever said horizontal synchronization signals differ from said horizontal sweep signals in phase or frequency, improved horizontal oscillator and drive circuitry comprising:
- an input terminal adapted to receive correction signals from said automatic frequency control circuit;
- first, second and third transistors each having base, emitter and collector electrodes;
- means connecting said input terminal to the base electrodes of said first and second transistors;
- a source of energizing potential;
- means connecting the collector electrodes of said first and second transistors to said source of energizing potential;
- first and second capacitors connected between the collector electrodes of said first and second transistors and the base electrodes of said second and first transistors respectively;
- means connecting the emitter electrode of said second transistor directly to the base electrode of said third transistor;
- means connecting the emitter electrodes of said first and third transistors to a point of reference potential;
- a load connected between the collector electrode of said third transistor and said source of energizing potential; and
- means coupling said load to said high voltage and sweep circuitry; feedback means connected between the base electrodes of said second and third transistors.

2. The invention according to claim 1 wherein said feedback means comprises a resistor.

3. The invention according to claim 2 wherein said feedback means comprises a diode.